(12) United States Patent
Call

(10) Patent No.: US 6,358,904 B1
(45) Date of Patent: *Mar. 19, 2002

(54) MULTICOMPONENT BLEACHING SYSTEM

(76) Inventor: Hans-Peter Call, Heinsberger Strasse 14a, 52531 Übach-Palenberg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,714

(22) Filed: Sep. 24, 1997

Related U.S. Application Data

(63) Continuation of application No. 08/564,200, filed as application No. PCT/EP94/01967 on Jun. 16, 1994, now abandoned.

(30) Foreign Application Priority Data

Jun. 16, 1993 (DE) .......................... P 43 19 696

(51) Int. Cl.$^7$ .......................... C11D 3/39; C11D 3/395; C11D 3/386
(52) U.S. Cl. .......................... 510/376; 510/374; 510/305; 510/309; 510/311; 510/314; 510/320; 510/378; 252/186.38; 252/186.39
(58) Field of Search .......................... 252/186.38, 186.39; 510/305, 309, 311–314, 372, 374, 376, 378; 8/101–111

(56) References Cited

U.S. PATENT DOCUMENTS

| | | | | |
|---|---|---|---|---|
| 3,625,904 A | * | 12/1971 | Nosler et al. | 510/319 X |
| 3,986,974 A | * | 10/1976 | Loffelman et al. | 510/314 X |
| 4,164,395 A | * | 8/1979 | Finley et al. | 510/314 X |
| 5,069,812 A | * | 12/1991 | Humphreys et al. | 510/314 |
| 5,112,514 A | * | 5/1992 | Bolken et al. | 510/314 |
| 5,273,896 A | * | 12/1993 | Pedersen et al. | 435/192 |
| 5,288,746 A | * | 2/1994 | Pramod | 510/305 |
| 5,948,122 A | * | 9/1999 | Xu et al. | |
| 6,048,367 A | * | 4/2000 | Damhus et al. | |

FOREIGN PATENT DOCUMENTS

| | | | |
|---|---|---|---|
| DE | 1085131 | | 7/1960 |
| DE | 1918729 | | 11/1969 |
| DE | 4231767 | | 3/1994 |
| FR | 1569954 | | 6/1969 |
| GB | 1225713 | * | 3/1971 |
| WO | 9218687 | | 10/1992 |

\* cited by examiner

Primary Examiner—Margaret Einsmann
(74) Attorney, Agent, or Firm—Friedrich Kueffner

(57) ABSTRACT

A multicomponent system for use in detergent substances consists of oxidation catalysts and suitable oxidizing agents and aliphatic, cycloaliphatic, heterocyclic or aromatic compounds containing NO, NOH or (A).

17 Claims, No Drawings

MULTICOMPONENT BLEACHING SYSTEM

This is a continuation of application Ser. No. 08/564,200 filed Mar. 4, 1996 now abandoned which is a 371 or PCT/EP94/01967 filed Jun. 16, 1994.

This invention relates to a new multi-component bleaching system for use with detergent substances. Particularly in the low-temperature range the traditional bleaching systems in domestic detergents are unsatisfactory.

Below a washing temperature of 60° C. the standard bleach H2O2/sodium perborate/sodium percarbonate has to be activated by the addition of chemical bleach activators like TAED and SNOBS. There is also a quest for better biologically degradable, bio-compatible and low-dosage bleaching systems for low-temperature wash. Though enzymes are already in technical use for protein starch and dissolving of grease as well as the treatment of fibres during the washing process, there is not yet any enzymic principle available for detergent bleach.

In WO 1/05839 the use of various oxidising enzymes (oxidases and peroxidases) to present dye transfer is described. Peroxidases are known to be able to "decolour" various pigments (3-hydroxy-flavour and betalain by means of horse-radish peroxidase, carotene by means of peroxidase).

The Patent itself describes the decolouring (also termed bleaching) of the textile dyes in the liquor/bath and removed from the wash (conversion of a dyed substrate into an undyed, oxidised substance). The enzyme should possess the advantage of only decolouring dissolved dye—in contrast with e.g. hypochlorite, which attacks the dye on or in the tissue—with hydrogen peroxide or an appropriate precursor on hydrogen peroxide generated in situ being involved in the catalysis of the decolouring. The enzyme reaction can be partly increased by additional oxidisable enzyme substrate—e.g. metallic ions like ($Mn^{++}$, halogen ions like Cl- and Br- or organic phenols like p-hydroxy-cinnamic acid 2.4 dichlorphenol. This demands the formation of short-lived radicals or other oxidised conditions of the added substrate—which are responsible for the bleach or another modification of the dyed substance.

In U.S. Pat. No. 4,077,6768 the use of iron porphin, haemin chloride or iron phtalocyanine or derivatives together with hydrogen peroxide to prevent dye transfer is described. These substances are rapidly destroyed with a surplus of peroxide, and so care must be taken with the formation of hydrogen peroxide.

The aim of this invention, therefore, is to make available a multi-component bleaching system for use with detergent substances which stands out from the state of the art in terms of biological degradability, bio-compatibility, dosage and bleaching efficiency.

The problem was solved by finding a multi-component bleaching system consisting of oxidation catalysts and suitable oxidising agents as well as aliphatic, cyclo-aliphatic, hetero-cyclic or aromatic NO, NOH or

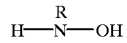

compounds—which even bleaches stubborn dirt such as coffee and tea stains.

The special feature of the invention is the novel use of a mixture of enzyme and mediator to bleach dirt in tissue (comparable to conventional bleaching systems). The enzyme reaction from the mediator causes a "bleach active intermediate" able to attack dirt, even when it is not enzyme substrate.

Apart from this "unspecific" attack an oxidation is probable, because of specific enzymes, of dirt generally regarded as problem stains from fruit, tannin from tea, coffee and red wine.

In another case a stabilised per-acid precursor can through bonding to an enzyme substrate be "activated" by means of the enzyme reaction, and so the bleaching effect can take place due to the high oxidation potential of the released per-acid.

Oxidoreductases are used by preference as catalysts for the invention. The main ones are oxidases, peroxidases, lignin-peroxidases, manganese peroxidases, laccases.

Preferred are enzymes extracted from genetically manipulated organisms, such as fungi, bacteria, animals and plants. Also usable are parts of plants and animals such as cell cultures.

White-rot fungui in particular have proved their worth as fungi for enzyme extraction. Coriolus versicolor is the special one.

Also for use are modified enzymes, enzyme components, prosthetic groups or haem groups and compounds containing haem groups. The last-named are mimic compounds. Mimic substances are those that, as in the case of laccase simulation, represent copper complexes, imitate the effect of catalytically active prosthetic groups and so can carry out oxidation with the usual laccase substrates.

As NO, NHO and

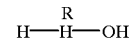

compounds there are the aliphatic, cyclo-aliphatic, hetero-cyclic or aromatic compounds N-hydroxy, oxime, N-oxide and N-dioxide compounds, hydroxylamine, its derivatives, hydroxamic acids or derivatives in single or multi-component systems. Also the bleaching system may contain phenolic and/or non-phenolic compounds with one or more benzene nuclei. All these compounds serve as so-called mediators.

The invention oxidising agents are air, oxygen, $H_2O_2$, organic peroxides, sodium perborate and/or sodium percarbonate. Oxygen can also be generated through $H_2O_2$+ catalase or similar systems or $H_2O_2$ from GOD+glucose or similar systems in situ.

Also preferred is a cation-forming multi-component bleaching system containing metallic salts. Cations to be used are Fe2+, Fe3+, Mn2+, Mn3+, Mn4+, Cu+, Cu2+, Ti3+, Cer4+, Mg2+ and Al3+.

The bleaching system can also contain polysaccharides and/or proteins. Polysaccharides to look for are glucan, mannan, dextran, laevan, pectin, alginate, gum and/or a few of the polysaccharides formed from fungi or produced in mixed culture with yeasts. Proteins can be gelatine and albumin.

There may also be added simple sugar/monosaccharide, oligomer sugar, amino acids, PEG, polythylene oxides, polyehtylenimines and polydimethylsiloxanes.

The invention multi-component bleaching system may be used in combination with well-known active detergent additives.

The bleaching system shows its effect in a pH of 2–12—preferably 4–10—and at temperatures of 10–60° C.—preferably 20–40° C.

EXAMPLE 1

Effect of laccase/mediator system on (BC2) coffee-stained standard cotton Cloth/rag.

Example: In 100 ml washing-solution (in 300 ml Erlenmeyer flask) one cloth/rag each (5×5 cm) is incubated at 40° C. for 40 min. with reciprocal agitation (120 cpm).

Before the start of incubation the washing.solution is subjected to ten minutes of agjustment to temperature. The solution is prepared with STW (Standard Tap Water at 14° dH. The enzyme sosage is 200.000 IU laccase from coriolus versicolor/100 ml, the mediator dosage 200 mg hydroxybenzotriazole/100 ml).

After the "washing-lye/buck" has been poured off, it is filled up with a cold, strong jet of water 3× and poured off.

Table 1 shows the results compared with a commercial liquid detergent (without bleaching system) and a heavy-duty detergent (with bleaching agent).

EXAMPLE 2

Effect of laccase/mediator system on (BC3) tea-stained standard wool cloth/rag.

In 100 ml washing-solution (in 300 ml Erlenmeyer flask) one cloth/rag each (5×5 cm) is incubated at 40° C. for 40 min. with reciprocal agitation (120 rpm).

Before the start if incubation the washing-solution is subjected to ten minutes of adjustment to temperature. The solution is prepared with STW (Standard Tap Water at 14°-I dH. The enzyme dosage is 200.000 IU laccase from coriolus versicolor/100 ml, the mediator dosage 200 mg hydroxybenzotriazole/100 ml).

After the "washing-lye/buck" has been poured off, it is filled up with a cold, strong jet of water 3× and poured off.

The results are shown in Table 2.

EXAMPLE 3

An experiment was carried out in accordance with Example 1. The mediator was acetoxybenzotriazole. The result is shown in Table 3.

TABLE 3

|  | pH | Degree of whiteness | Degree of lightness |
| --- | --- | --- | --- |
| STW zero valency | 4.5 | 2.55 | 2.3 |
| Heavy-duty detergent | 10.1 | 8.9 | 6.15 |
| STW + enzyme + mediator | 4.5 | 5 | 6.1 |
| Uquid detergent | 4.5 | 3.85 | 3.75 |
| Liquid detergent + enzyme + mediator | 4.5 | 6.2 | 6.7 |

TABLE 1

|  | pH | BC2 Whiteness % | BC2 Lightness % |
| --- | --- | --- | --- |
| STW zero valency | 4.5 | 2.55 | 2.3 |
| Heavy-duty detergent | 10.1 | 8.9 | 6.15 |
| STW + enzyme + mediator | 4.5 | 4.9 | 5.8 |
| Liquid detergent | 4.5 | 3.85 | 3.75 |
| Liquid detergent + enzyme + mediator | 4.5 | 6.15 | 6.6 |

TABLE 2

|  | ph | BC3 whiteness % | BC3 Lightness % |
| --- | --- | --- | --- |
| STW zero valency | 4.5 | 2.1 | 2.5 |
| Heavy-duty detergent | 10.1 | 9.95 | 8.6 |
| STW + enzyme + mediator | 4.5 | 4.2 | 4.7 |
| Liquid detergent | 4.5 | 4.7 | 4.7 |
| Liquid detergent + enzyme + mediator | 4.5 | 5.5 | 5.95 |

What is claimed is:

1. A multi-component bleaching system for use with detergent substances, wherein, for the immediate oxidizing attack of substances to be bleached, the multicomponent bleaching system includes selected enzymatic oxidation catalysts and oxidizing agents suitable for electron transfer, the oxidation agents being selected from the group consisting of air, oxygen, $H_2O_2$, organic peroxide, sodium perborate and sodium percarbonate, and wherein the multicomponent bleaching system additionally includes at least one mediator from the group consisting of hydroxybenzotriazole or acetoxybenzotriazole or from a combination of these compounds and wherein the enzymatic oxidation catalysts additionally form a bleaching intermediate by way of the mediators, the bleaching intermediate itself being capable of attacking stains.

2. The multicomponent bleaching system according to claim 1, wherein the oxidation catalysts are oxidoreductases.

3. The multicomponent bleaching system according to claim 2, wherein the oxidoreductases are selected from the group consisting of oxidases, peroxidases and laccases.

4. The mutlicomponent bleaching system according to claim 3, wherein the peroxidases are selected from the group consisting of lignin-peroxidases and managanese peroxidases.

5. The multicomponent bleaching system according to claim 2, wherein the oxidoreductases are enzymes extracted from natural or genetically manipulated organisms selected from the group consisting of bacteria, fungi, animals and plants.

6. The multicomponent bleaching system according to claim 5, wherein the oxidoreductases are enzymes extracted from natural or genetically manipulated white-rot fungi.

7. The multicomponent bleaching system according to claim 5, wherein the enzymes are obtained from coriolus versicolor.

8. The multicomponent bleaching system according to claim 2, wherein the oxidation catalysts are selected from the group consisting of modified enzymes, enzyme components, prosthetic groups, and mimicking substances.

9. The multicomponent bleaching system according to claim 8, wherein the mimicking substances are one of heme groups and compounds containing heme groups.

10. The multicomponent bleaching system according to claim 1, further comprising at least one of phenolic compounds and non-phenolic compounds having at least one benzene nucleus.

11. The multicomponent bleaching system according to claim 1, wherein the oxygen is a reaction product generated in situ from $H_2O_2$+catalase or from GOD+glucose.

12. The multicomponent bleaching system according to claim 1, wherein the multicomponent bleaching system contains cation-forming metal salts.

13. The multicomponent bleaching system according to claim 12, wherein the cations are selected from the group consisting of $Fe^{2+}$, $Fe^{3+}$, $Mn^{2+}$, $Mn^{3+}$, $Mn^{4+}$, $Cu^+$, $Cu^{2+}$, $Ti^{3+}$, $Cer^{4+}$, $Mg^{2+}$, and $Al^{3+}$.

14. The multicomponent bleaching system according to claim 1, further comprising at least one of polysaccharides and proteins.

15. The multicomponent bleaching system according to claim 14, wherein the polysaccharides are selected from the group consisting of glucan, mannan, dextran, laevan, pectin, alginate, gum and polysaccharides produced from fungi or produced in mixed culture cells with yeasts.

16. The multicomponent bleaching system according to claim 14, wherein the proteins are selected from the group consisting of gelatine and albumin.

17. The multicomponent bleaching system according to claim 1, further comprising additives selected of the group consisting of monosaccharides, oligomer sugar, amino acids, polyethylene glycols, polyethylene oxides, polyethylenimines, and polydimethylsiloxanes.

* * * * *